US012737203B2

(12) United States Patent
Jung et al.

(10) Patent No.: US 12,737,203 B2
(45) Date of Patent: Sep. 15, 2026

(54) METHOD OF OPTIMIZING EXECUTION OF RPA BOT

(71) Applicant: SAMSUNG SDS CO., LTD., Seoul (KR)

(72) Inventors: Hwang Young Jung, Seoul (KR); Hyo Young Kim, Seoul (KR); Jae Cheol Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 205 days.

(21) Appl. No.: 18/383,689

(22) Filed: Oct. 25, 2023

(65) Prior Publication Data

US 2024/0143357 A1 May 2, 2024

(30) Foreign Application Priority Data

Oct. 27, 2022 (KR) ........................ 10-2022-0140520

(51) Int. Cl.
*G06F 9/44* (2018.01)
*G06F 9/455* (2018.01)

(52) U.S. Cl.
CPC ................................ *G06F 9/45512* (2013.01)

(58) Field of Classification Search
None
See application file for complete search history.

(56) References Cited

U.S. PATENT DOCUMENTS

| | | | |
|---|---|---|---|
| 10,710,239 B2 | 7/2020 | Safary et al. | |
| 11,074,063 B2 | 7/2021 | Mei et al. | |
| 11,453,131 B2 | 9/2022 | Caba et al. | |
| 12,332,633 B1 * | 6/2025 | Pandian | G06F 9/5005 |
| 2016/0266888 A1 * | 9/2016 | Nieves | G06F 8/65 |
| 2020/0306970 A1 | 10/2020 | Latkar et al. | |
| 2020/0387358 A1 | 12/2020 | Chae | |
| 2021/0122051 A1 * | 4/2021 | An | G06F 11/3013 |
| 2021/0197395 A1 | 7/2021 | Caba et al. | |
| 2022/0244927 A1 * | 8/2022 | Dabhi | G06F 8/443 |
| 2023/0023382 A1 * | 1/2023 | Mani | G06F 9/542 |

(Continued)

FOREIGN PATENT DOCUMENTS

| | | |
|---|---|---|
| CN | 113885911 A | 1/2022 |
| CN | 114489691 A | 5/2022 |

(Continued)

OTHER PUBLICATIONS

CN 113885911, Eng texts (Year: 2022).*
Search Report dated Feb. 27, 2024, issued by European Patent Office in European Patent Application No. 23205964.2.

*Primary Examiner* — Insun Kang
(74) *Attorney, Agent, or Firm* — Sughrue Mion, PLLC

(57) ABSTRACT

A robotic process automation (RPA) bot execution optimization method is provided. The method includes installing an RPA agent and a default RPA engine on the computing system in a process of installing an RPA solution; acquiring, by the installed RPA agent, an execution request for an RPA bot; determining, by the installed RPA agent, a representative version of an RPA scenario for the RPA bot; preparing, by the installed RPA agent, an optimal RPA engine version for executing the RPA scenario representative version; and controlling, by the installed RPA agent, the prepared optimal RPA engine version to execute the RPA scenario.

15 Claims, 15 Drawing Sheets

(56) References Cited

U.S. PATENT DOCUMENTS

| | | | | |
|---|---|---|---|---|
| 2023/0037297 | A1 * | 2/2023 | Parasuraman | G06F 9/451 |
| 2023/0236910 | A1 * | 7/2023 | Marinovici | G06F 40/205 715/234 |
| 2024/0111524 | A1 * | 4/2024 | Damodaran | G06Q 10/06395 |

FOREIGN PATENT DOCUMENTS

| | | | | |
|---|---|---|---|---|
| JP | 2021-125084 A | | 8/2021 | |
| WO | WO-2015103560 A2 | * | 7/2015 | G06F 9/45558 |

* cited by examiner 230a-1

```
<Rule id="29117afe-9b49-4ffd-971d-bc6ca999b888" name="Rule_Tree_Main_v246" ruleVersion="2.4.600.00706">
  <SubRules>
    <SubRule id="568307c1-e958-4b7a-9083-b889c1d1b4e0" name="Rule_Tree_A_v201" />
    <SubRule id="521d6890-6dc0-453a-b1ff-eddcdbbbdc00" name="Rule_Tree_B_v212" />
    <SubRule id="04d889e1-4189-4ca3-b195-05f5bf9041af" name="Rule_Tree_B1_v211" />
    <SubRule id="34d3fe12-8565-4437-a398-5d240effeffa" name="Rule_Tree_B2_v256" />
    <SubRule id="0901d46a-28ac-4310-919a-b8673c275427" name="Rule_Tree_C_v246" />
  </SubRules>
```

230a-2

```
<Rule id="568307c1-e958-4b7a-9083-b889c1d1b4e0" name="Rule_Tree_A_v201" ruleVersion="2.0.100.01222">
  <SubRules />
```

230a-3

```
<Rule id="521d6890-6dc0-453a-b1ff-eddcdbbbdc00" name="Rule_Tree_B_v212" ruleVersion="2.1.200.00629">
  <SubRules>
    <SubRule id="04d889e1-4189-4ca3-b195-05f5bf9041af" name="Rule_Tree_B1_v211" />
    <SubRule id="34d3fe12-8565-4437-a398-5d240effeffa" name="Rule_Tree_B2_v256" />
  </SubRules>
```

230a-4

```
<Rule id="04d889e1-4189-4ca3-b195-05f5bf9041af" name="Rule_Tree_B1_v211" ruleVersion="2.1.100.00207">
  <SubRules />
```

230a-5

```
<Rule id="34d3fe12-8565-4437-a398-5d240effeffa" name="Rule_Tree_B2_v256" ruleVersion="2.5.600.00919">
  <SubRules />
```

230a-6

```
<Rule id="0901d46a-28ac-4310-919a-b8673c275427" name="Rule_Tree_C_v246" ruleVersion="2.4.600.00706">
  <SubRules />
```

| ENGINE VERSION | EXECUTABLE RPA SCENARIO REPRESENTATIVE VERSION |
|---|---|
| v2.1.0.00302 | 2.1.0, 2.0.0~2.1.0 |
| v2.1.0.00423 | 2.1.0, 2.0.0~2.1.0 |
| v2.1.2.00503 | 2.1.2, 2.0.0~2.1.2 |
| v2.4.5.00509 | 2.4.5, 2.0.0~2.4.5 |
| v2.5.5.00612 | 2.5.5, 2.0.0~2.5.5 |
| v3.0.0.00814 | 3.0.0 |
| ... | ... |

| | SCORE INDEX | WEIGHT | CRITERION | EQUATION |
|---|---|---|---|---|
| 1221 | SUCCESS RATE | 50 | - HIGHER ▲ | (NUMBER OF SUCCESSES/NUMBER OF USAGES) |
| 1222 | TIME TAKEN | 30 | - SHORTER ▲<br>(UNIT OF TIME: SEC) | (MAXIMUM TIME TAKEN AMONG ALL RPA ENGINES-AVERAGE TIME TAKEN FOR EACH PARTICULAR RPA ENGINE) /MAXIMUM TIME TAKEN AMONG ALL RPA ENGINES |
| 1223 | FREQUENCY OF USAGE | 10 | - HIGHER ▲ | (AVERAGE NUMBER OF USAGES AMONG ALL RPA ENGINES -AVERAGE NUMBER OF USAGES FOR EACH PARTICULAR RPA ENGINE)/AVERAGE NUMBER OF USAGES FOR ALL RPA ENGINES |
| 1224 | NUMBER OF DAYS ELAPSED SINCE RECENT USAGE | 10 | - MORE RECENTLY USED ▲<br>- SCORE OF 100 IF ALL RPA ENGINES HAVE BEEN USED ON THE SAME DAY | (MAXIMUM NUMBER OF DAYS ELAPSED SINCE RECENT USAGE AMONG ALL RPA ENGINES-NUMBER OF DAYS ELAPSED SINCE RECENT USAGE FOR EACH PARTICULAR RPA ENGINE)/MAXIMUM NUMBER OF DAYS ELAPSED SINCE RECENT USAGE AMONG ALL RPA ENGINES |
| | TOTAL | 100 | | |

| BOT ID | DATE OF COMPLETION | EXECUTION RPA ENGINE VERSION | RESULT | EXECUTION TIME |
|---|---|---|---|---|
| BOT_001 | 2022-03-02 | v2.1.3 | Pass | 300 |
| BOT_002 | 2022-03-02 | v2.1.3 | Pass | 283 |
| BOT_003 | 2022-03-02 | v2.1.3 | Pass | 192 |
| BOT_002 | 2022-03-04 | v2.1.3 | Fail | 26 |
| BOT_002 | 2022-03-06 | v2.1.3 | Pass | 462 |
| BOT_003 | 2022-03-02 | v2.1.3 | Pass | 611 |
| BOT_001 | 2022-03-06 | v2.1.3 | Fail | 73 |
| BOT_002 | 2022-03-20 | v2.2.0 | Pass | 200 |
| BOT_002 | 2022-03-21 | v2.2.0 | Fail | 95 |
| BOT_002 | 2022-03-28 | v2.5.0 | Pass | 512 |
| BOT_002 | 2022-03-29 | v2.5.0 | Pass | 325 |
| . | . | . | . | . |

| BOT ID | EXECUTION RPA ENGINE VERSION | SUCCESS RATE (50%) | TIME TAKEN (30%) | NUMBER OF USAGES (10%) | DAYS ELAPSED SINCE LAST USAGE (10%) | SUITABILITY |
|---|---|---|---|---|---|---|
| . | . | . | . | . | . | . |
| BOT_002 | v2.1.3 | 66.7 ← 2/3 | 49.8 ← (512-((283+26+462)/3))/512) | 42.8 ← 3/7 | 0 ←(24-24)/24 | 57.6 |
| | v2.2.0 | 50 ← 1/2 | 71.2 ←(512-((200+95)/2))/512) | 28.5 ← 2/7 | 87.5 ←(24-3)/24 | 58 |
| | v2.5.0 | **100 ← 2/2** | **18.2 ← (512-((512+325)/2))/512)** | **28.5 ← 2/7** | **95.8 ← (24-1)/24** | 67.9 |
| . | . | . | . | . | . | . |

METHOD OF OPTIMIZING EXECUTION OF RPA BOT

CROSS-REFERENCE TO RELATED APPLICATION

This application claims priority from Korean Patent Application No. 10-2022-0140520 filed on Oct. 27, 2022 in the Korean Intellectual Property Office, and all the benefits accruing therefrom under 35 U.S.C. 119, the contents of which in its entirety are herein incorporated by reference.

BACKGROUND

1. Field

The disclosure relates to robotic process automation (RPA) technology, and more particularly, to a method and software for automatically providing an optimized environment for an RPA bot, which refers to a series of actions automated by the RPA technology, in connection with the execution of the RPA bot and a computing system for providing the method.

2. Description of the Related Art

Robotic Process Automation (RPA), a technology designed to automate tasks repeatedly performed by users, has gained substantial attention within the field of Information Technology (IT). An object intended to execute a series of actions through RPA technology is commonly known as an RPA bot.

The RPA bot can automate target actions using an RPA scenario, typically generated in the form of a predefined file, and this file contains descriptions of the target actions and can be transmitted. For example, the RPA scenario may be written in the form of a script. Upon receiving an execution command for the RPA robot, the RPA engine reads and interprets the script, enabling the automated execution of the target actions.

Meanwhile, like other software, the RPA engine is subject to continuous updates. There may be situations where RPA scenarios crafted for an older version of the RPA engine may be executed in an environment equipped with a more recent version of the RPA engine installed. Alternatively, there may be situations where RPA scenarios crafted for the latest version of the RPA engine may be executed in an environment with the older version of the RPA engine installed.

When developing a new version of the RPA engine, considering backward compatibility is important, and if done properly, RPA bots created in the older version of the RPA engine should generally run without issues in an environment with the new version of the RPA engine installed. However, for various reasons, ensuring full backward compatibility is not always guaranteed. Even if careful attention is given to backward compatibility during the development of the new version of the RPA engine, it does not necessarily mean that all problems arising from running RPA scenarios created in an environment with the new version of the RPA engine on the older version of the RPA engine are completely resolved.

Moreover, when the new version of the RPA engine executes RPA scenarios created in an environment with the older version of the RPA engine, migrating the RPA bot's RPA scenario files to a format compatible with the new version of the RPA engine and running the migrated RPA scenarios in an environment with the new version of the RPA engine may be possible. However, this migration process becomes riskier in terms of compatibility-related side effects and compromises operational stability as the version differences between pre- and post-migration grow. Furthermore, the mentioned migration-based approach still does not fully resolve the problems that may arise when RPA scenarios created in an environment with the new version of the RPA engine are executed in an environment with the older version of the RPA engine installed.

SUMMARY

Aspects of the disclosure provide a robotic process automation (RPA) bot execution optimization method, which is capable of automatically establishing an optimal environment for RPA bot execution regardless of whether the RPA environment of a computing device where an RPA scenario is created matches the RPA environment of a computing device where the RPA bot of the RPA scenario is executed, an RPA solution employing the RPA bot execution optimization method, and a service server supporting the operation of the RPA bot execution optimization method.

Aspects of the disclosure also provide an RPA engine-independent computer program controlling the execution of an RPA bot and an RPA solution consisting of the RPA engine.

Aspects of the disclosure also provide an RPA bot execution optimization method, which can enhance the stability of RPA bot execution by automatically configuring an optimal RPA engine version, among other RPA engine versions, when securing an RPA engine version identical to that installed in a computing system where the RPA bot is created is not feasible, an RPA solution employing the RPA bot execution optimization method, and a service server supporting the operation of the RPA bot execution optimization method.

However, aspects of the disclosure are not restricted to those set forth herein. The above and other aspects of the disclosure will become more apparent to one of ordinary skill in the art to which the disclosure pertains by referencing the detailed description of the disclosure given below.

According to an aspect of the disclosure, there is provided a robotic process automation (RPA) bot execution optimization method executed by a computing system. The method may comprise installing an RPA agent and a default RPA engine on the computing system in a process of installing an RPA solution, acquiring, by the installed RPA agent, an execution request for an RPA bot, determining, by the installed RPA agent, a representative version of an RPA scenario for the RPA bot, preparing, by the installed RPA agent, an optimal RPA engine version for executing the RPA scenario representative version and controlling, by the installed RPA agent, the prepared optimal RPA engine version to execute the RPA scenario.

In some embodiments, the RPA scenario is a script describing an automation target action in accordance with the execution of the RPA bot, the automation target action includes a main rule and one or more sub-rules embedded in the main rule, the script includes meta information regarding the main rule and sub-rules, the meta information includes version information for the main rule and version information for the sub-rules, the version information corresponds to an RPA engine version used during the creation of the main rule or the sub-rules, and the determining the RPA scenario representative version, comprises determining one of a version corresponding to the version information for the main rule and a version corresponding to the version information for the sub-rules as the RPA scenario representative version.

In some embodiments, the determining one of the version corresponding to the version information for the main rule and the version corresponding to the version information for the sub-rules as the RPA scenario representative version, may comprise loading a script of the RPA scenario, parsing the loaded script to identify rule hierarchical relationships between the main rule and the sub-rules of the RPA scenario, identifying versions of the main rule and sub-rules of the RPA scenario using the identified rule hierarchical relationships, and determining one of the identified versions of the main rule and sub-rules as the RPA scenario representative version.

In some embodiments, the determining one of the version corresponding to the version information for the main rule and the version corresponding to the version information for the sub-rules as the RPA scenario representative version, may comprise determining whichever of the version corresponding to the version information for the main rule and the version corresponding to the version information for the sub-rules is a latest rule version as the RPA scenario representative version.

In some embodiments, the determining one of the version corresponding to the version information for the main rule and the version corresponding to the version information for the sub-rules as the RPA scenario representative version, may comprise determining whether an option to use a version of the main rule as the RPA scenario representative version is activated, and if a determination is made that the option to use the version of the main rule as the RPA scenario representative version is activated, determining the version corresponding to the version information for the main rule as the RPA scenario representative version.

In some embodiments, the preparing the optimal RPA engine, may comprise, if there exists a first RPA engine of a same version as the RPA scenario representative version among multiple different RPA engine versions installed on the computing system, and choosing the first RPA engine as the optimal RPA engine, and the multiple different RPA engine versions may include a default engine and additional RPA engine versions additionally installed on the computing device by the RPA agent.

In some embodiments, the preparing the optimal RPA engine version, may further comprise sending a request for an update package for the first RPA engine to the RPA agent service server and downloading the update package for the first RPA engine.

In some embodiments, the preparing the optimal RPA engine version may comprise sending an optimal RPA engine version provisioning request signal for the RPA scenario representative version to an RPA agent service server, if a first RPA engine of a same version as the RPA scenario representative version does not exist among multiple different RPA engine versions installed on the computing system, determining, by the RPA agent service server, an optimal RPA engine package based on multiple priority-based criteria for optimal version selection, and transmitting, by the RPA agent service server, data of the determined optimal RPA engine package to the computing device, and the multiple priority-based criteria may include primarily prioritizing an RPA engine of the same version as the RPA scenario representative version, secondarily prioritizing an RPA engine with a recommended version for the RPA scenario representative version, and tertiarily prioritizing an RPA engine equipped with an engine profile included in RPA engine versions capable of executing the RPA scenario representative version.

In some embodiments, the recommended version for the RPA scenario representative version may be acquired from a table of recommended RPA engine versions for various RPA scenario representative versions, created and updated based on RPA bot execution result report data transmitted by the RPA agent.

In some embodiments, the RPA bot execution optimization method may further comprise monitoring, by the installed RPA agent, whether the execution of the RPA bot is completed and upon completion, generating, by the installed RPA agent, RPA bot execution report data containing one or more metrics associated with the execution of the RPA bot and transmitting, by the installed RPA agent, the RPA bot execution report data to the RPA agent service server.

In some embodiments, the RPA bot execution optimization method may further comprise creating and updating, by the RPA agent service server, a table of recommended RPA engine versions for various RPA scenario representative versions based on the RPA bot execution report data transmitted by the RPA agent, wherein the recommended RPA engine versions for the various RPA scenario representative versions are determined based on suitability scores calculated using the one or more metrics included in the RPA bot execution report data, and the suitability scores are calculated using a first metric indicating a success rate of executing the RPA scenario representative version with each target RPA engine version, a second metric indicating an amount of time taken to execute each target RPA engine version in connection with the execution of the RPA scenario representative version, a third metric indicating a frequency of usage of each target RPA engine version in the execution of the RPA scenario representative version, and a fourth metric indicating the time elapsed since a recent usage of each targeted RPA engine version in executing the RPA scenario representative version.

In some embodiments, the suitability scores may be calculated by reflecting and combining weights for the first through fourth metrics, a highest weight may be assigned to the first metric, and a second-highest weight may be assigned to the second metric.

According to another aspect of the disclosure, there is provided a robotic process automation (RPA) solution recorded on a computer-readable recording medium. The RPA solution may be executed by a computing system to execute the steps of installing an RPA agent on the computing system, installing a default RPA engine on the computing system and consistently executing the RPA agent in a background mode, wherein the RPA agent acquires an execution request for an RPA bot, determines a representative version of an RPA scenario for the RPA bot, prepares an optimal RPA engine version for executing the RPA scenario representative version, and controls the prepared optimal RPA engine version to execute the RPA scenario.

In some embodiments, the RPA solution may comprise a communication interface exchanging data with the computing system where the RPA agent is installed, a memory where an RPA agent service program is loaded, and a processor executing the RPA agent service program, the RPA agent service program may include instructions for receiving an optimal RPA engine provisioning request signal for the RPA scenario representative version from the RPA agent if a first RPA engine of a same version as the RPA scenario representative version does not exist among multiple different RPA engine versions installed on the computing system where the RPA agent is installed, instructions for determining an optimal RPA engine package based on multiple priority-based criteria for optimal version selection, and instructions for transmitting data of the determined optimal RPA engine package to the RPA agent, and the multiple priority-based criteria may include primarily prioritizing an RPA engine of the same version as the RPA scenario representative version, secondarily prioritizing an RPA engine with a recommended version for the RPA scenario representative version, and tertiarily prioritizing an RPA engine equipped with an engine profile included in RPA engine versions capable of executing the RPA scenario representative version.

In some embodiments, the RPA agent service program may further include instructions for receiving RPA bot execution result report data containing one or more metrics associated with the execution of the RPA bot from the RPA agent upon completion of the execution of the RPA bot and instructions for creating and updating a table of recommended RPA engine versions for various RPA scenario representative versions based on the RPA bot execution result report data, the recommended RPA engine versions for the various RPA scenario representative versions may be determined based on suitability scores calculated using the one or more metrics included in the RPA bot execution result report data, and the suitability scores may be calculated using a first metric indicating a success rate of executing the RPA scenario representative version with each target RPA engine version, a second metric indicating an amount of time taken to execute each target RPA engine version in connection with the execution of the RPA scenario representative version, a third metric indicating a frequency of usage of each target RPA engine version in the execution of the RPA scenario representative version, and a fourth metric indicating a time elapsed since a recent usage of each targeted RPA engine version in executing the RPA scenario representative version.

It should be noted that the effects of the disclosure are not limited to those described above, and other effects of the disclosure will be apparent from the following description.

BRIEF DESCRIPTION OF THE DRAWINGS

The above and other aspects and features of the disclosure will become more apparent by describing in detail example embodiments thereof with reference to the attached drawings, in which:

FIG. 7 illustrates example syntaxes for defining meta information of each rule, which are defined through tags in a script, for a better understanding of the rule hierarchy explained with reference to FIG. 6;

FIG. 10 illustrates an example table of executable rule versions for different RPA engines, which can be referenced in some embodiments of the disclosure;

FIGS. 12 through 14 illustrate example data that can be generated and referenced in some embodiments of the disclosure to determine and update recommended RPA engine versions for various RPA scenario representative versions.

DETAILED DESCRIPTION

Figure 1:
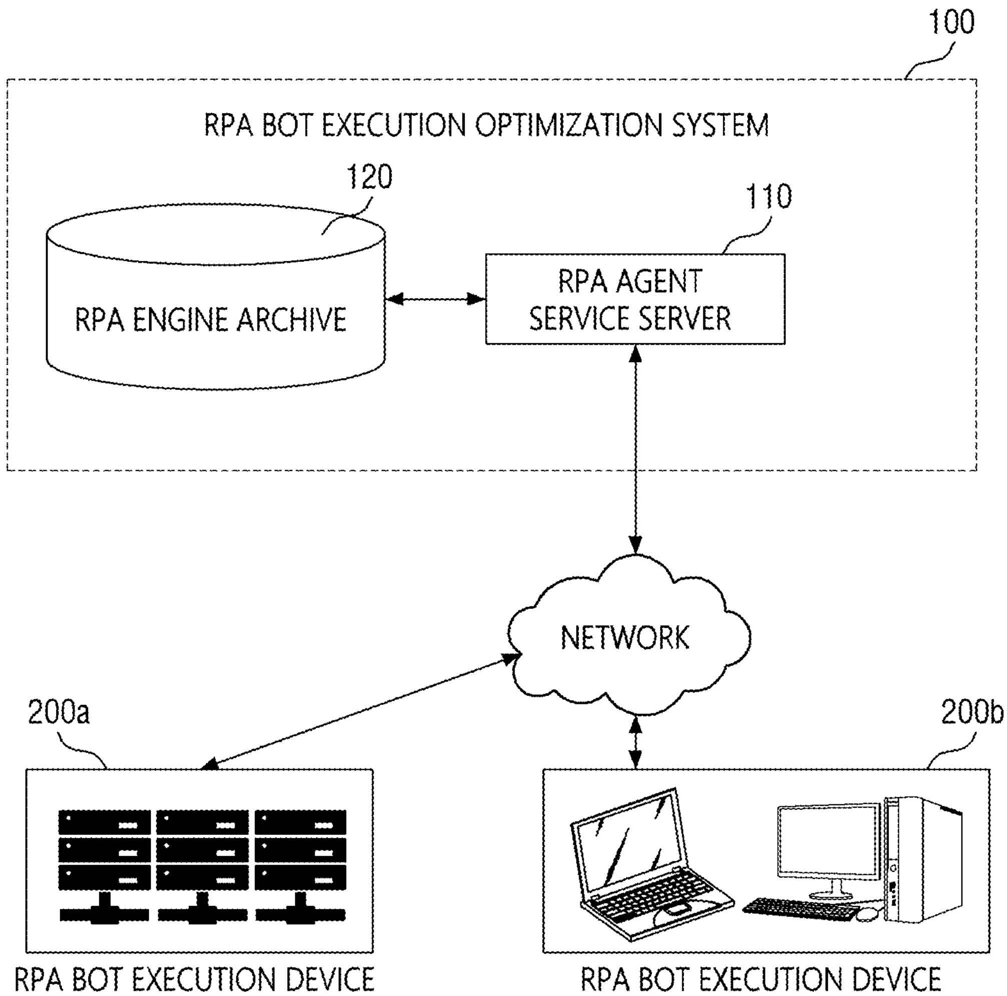
FIG. 1 illustrates the configuration of a robotic process automation (RPA) system according to an embodiment of the disclosure.

Hereinafter, preferred embodiments of the disclosure will be described with reference to the attached drawings. Advantages and features of the disclosure and methods of accomplishing the same may be understood more readily by reference to the following detailed description of preferred embodiments and the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims.

In adding reference numerals to the components of each drawing, it should be noted that the same reference numerals are assigned to the same components as much as possible even though they are shown in different drawings. In addition, in describing the disclosure, when it is determined that the detailed description of the related well-known configuration or function may obscure the gist of the disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Some of the terms mentioned in the disclosure will hereinafter be described.

The term "RPA scenario" refers to data describing a series of repetitive actions intended for unmanned automation, along with the flow of the series of actions or a file storing the data. For example, an RPA scenario may be written in the form of a script file. Additionally, the RPA scenario may be created using a tool such as an RPA scenario editor to outline the flow of the series of actions.

The term "RPA bot" refers to an instance executing a series of actions repeatedly according to the RPA scenario. For example, the RPA bot may result from the execution of the RPA scenario by an RPA engine.

An RPA system according to an embodiment of the disclosure will hereinafter be described with reference to FIG. 1. The RPA system may consist of one or more computing systems to which RPA technology for automating repetitive tasks is applied. Referring to FIG. 1, the RPA system may include RPA bot execution devices 200*a* and 200*b*, which execute pre-established RPA scenarios, and an RPA bot execution optimization system 100.

The RPA bot execution optimization system 100 may include an RPA engine archive 120 and an RPA agent service server 110. The RPA engine archive 120 may include storage means for different versions of RPA engine packages. Additionally, the RPA agent service server 110 may deliver an optimal RPA engine version for a representative version of an RPA scenario to, or receive RPA bot execution result report data from, RPA agents within the RPA bot execution devices 200*a* and 200*b*.

FIG. 1 illustrates that the RPA engine archive 120 and the RPA agent service server 110 are physically separate computing systems, but alternatively, the RPA engine archive 120 and the RPA agent service server 110 may also be implemented as a single computing system.

The RPA bot execution devices 200*a* and 200*b* may be categorized into a host server-type RPA bot execution device 200*a* and a user terminal-type RPA bot execution device 200*b*. The host server-type RPA bot execution device 200*a* may provide a remote desktop with user access rights or offer the physical resources of a virtual machine to which user access rights have been granted. A user may manipulate the host server-type RPA bot execution device 200*a* via a separate terminal (not illustrated) connected to the network, thereby executing an RPA bot.

Each RPA scenario may be an XML-based script, where each action to be automatically executed is hierarchically defined as a specific level tag. Furthermore, since the actions to be automatically executed have a designated order, the tags that define these actions may be positioned in the script of each RPA scenario according to their execution sequence.

Each RPA scenario may be downloaded from an RPA scenario repository (not illustrated) within the RPA bot execution optimization system 100 and stored on the RPA bot execution device 200*a* or 200*b*.

The RPA bot consists of one main rule and one or more sub-rules embedded within the main rule, and the RPA engine version used during the creation of the main rule or sub-rules, as meta information regarding the main rule and sub-rules, may be included as rule version information in the script. The meta information regarding the main rule or sub-rules may be automatically recorded by an RPA scenario editor.

The RPA scenario editor may verify the RPA engine version installed on the computing system where the RPA scenario editor is installed and may record the verified RPA engine version in meta information regarding the rule currently being authored.

Consequently, if rules of the RPA scenario are created on computing systems with different RPA engine versions installed, the RPA scenario may include multiple RPA engine versions.

When a command to execute the RPA scenario is input by the user, an RPA agent installed on the RPA bot execution device 200*a* or 200*b* may determine the representative version of the RPA scenario, prepare an optimal RPA engine version for executing the representative version of the RPA scenario, and control the prepared optimal RPA engine version to execute the RPA scenario.

In a case where the RPA agent determines that the optimal RPA engine version installed on the RPA bot execution device 200*a* or 200*b* cannot execute the representative version of the RPA scenario, the RPA agent may request the provision of the optimal RPA engine version for executing the representative version of the RPA scenario from the RPA agent service server 110.

As mentioned earlier, the RPA agent can function as a computer program controlling the execution of the RPA scenario using the RPA engine and is yet independent from the RPA engine. Detailed explanations of the logical module configuration and operation of the RPA agent will be provided later with reference to FIG. 3.

Figure 2:
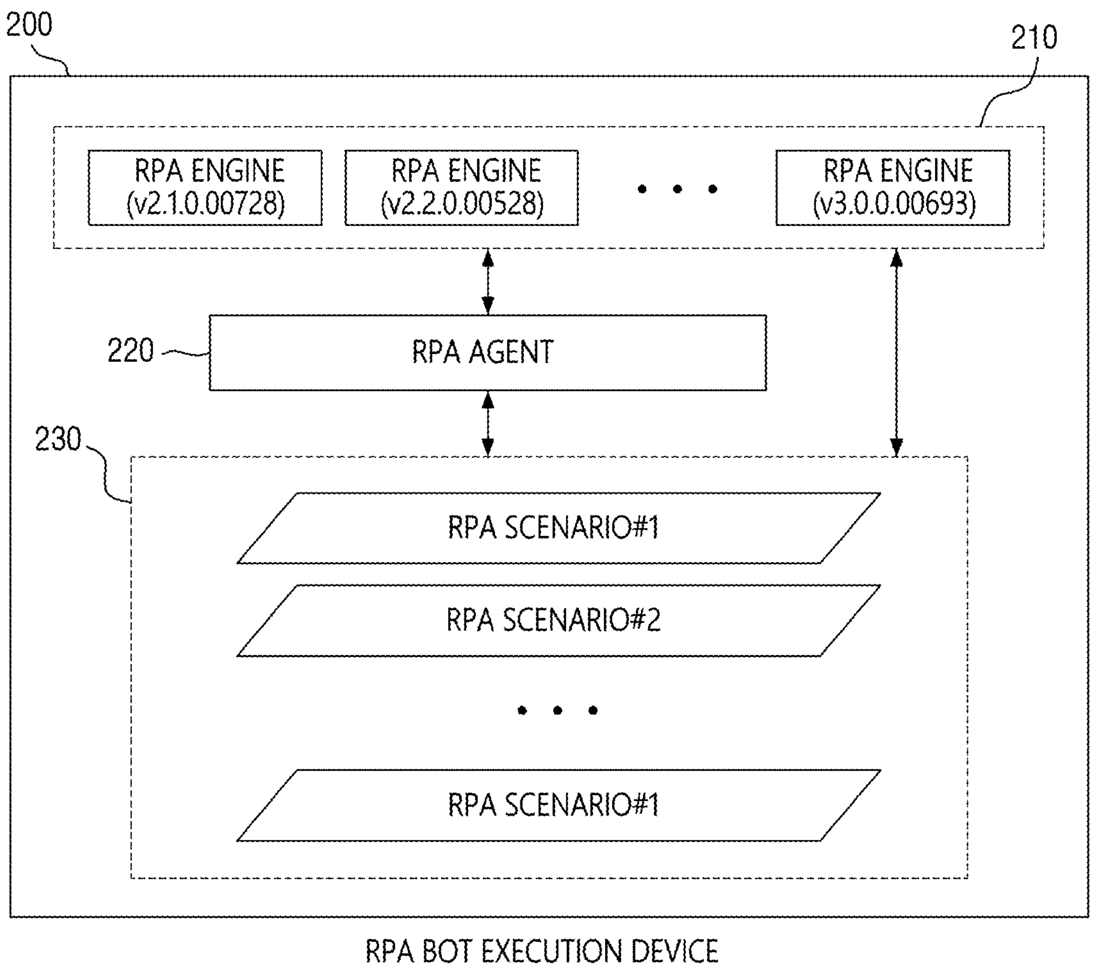
FIG. 2 illustrates the configuration of an RPA bot execution device according to an embodiment of the disclosure.

The configuration and operation of an RPA bot execution device according to an embodiment of the disclosure will hereinafter be described with reference to FIG. 2. Referring to FIG. 2, an RPA bot execution device 200 may include an RPA engine repository 210, which stores one or more RPA engine versions installed on the RPA bot execution device 200, an RPA agent 220, and an RPA scenario repository 230, which stores one or more RPA scenarios.

The RPA engine repository 210 may store a default engine installed along with the RPA agent 220 during the initial installation of an RPA solution and may also store additional RPA engine versions installed by the RPA agent 220.

The RPA agent 220 is implemented via a memory loading an RPA agent computer program and a processor executing the RPA agent computer program, and the RPA engine repository 210 and the RPA scenario repository 230 may be implemented via storage means provided on, or connected to, the RPA bot execution device 200.

The RPA bot execution device 200 may refer to a computing system where an RPA solution according to an embodiment of the disclosure is downloaded and installed. In contrast to conventional RPA solutions, the RPA solution according to an embodiment of the disclosure provides an RPA engine-independent RPA agent 220 and an RPA engine repository 210 that permits the installation of multiple RPA engine versions.

The operation of the RPA agent 220 will hereinafter be described with reference to FIG. 3.

Figure 3:
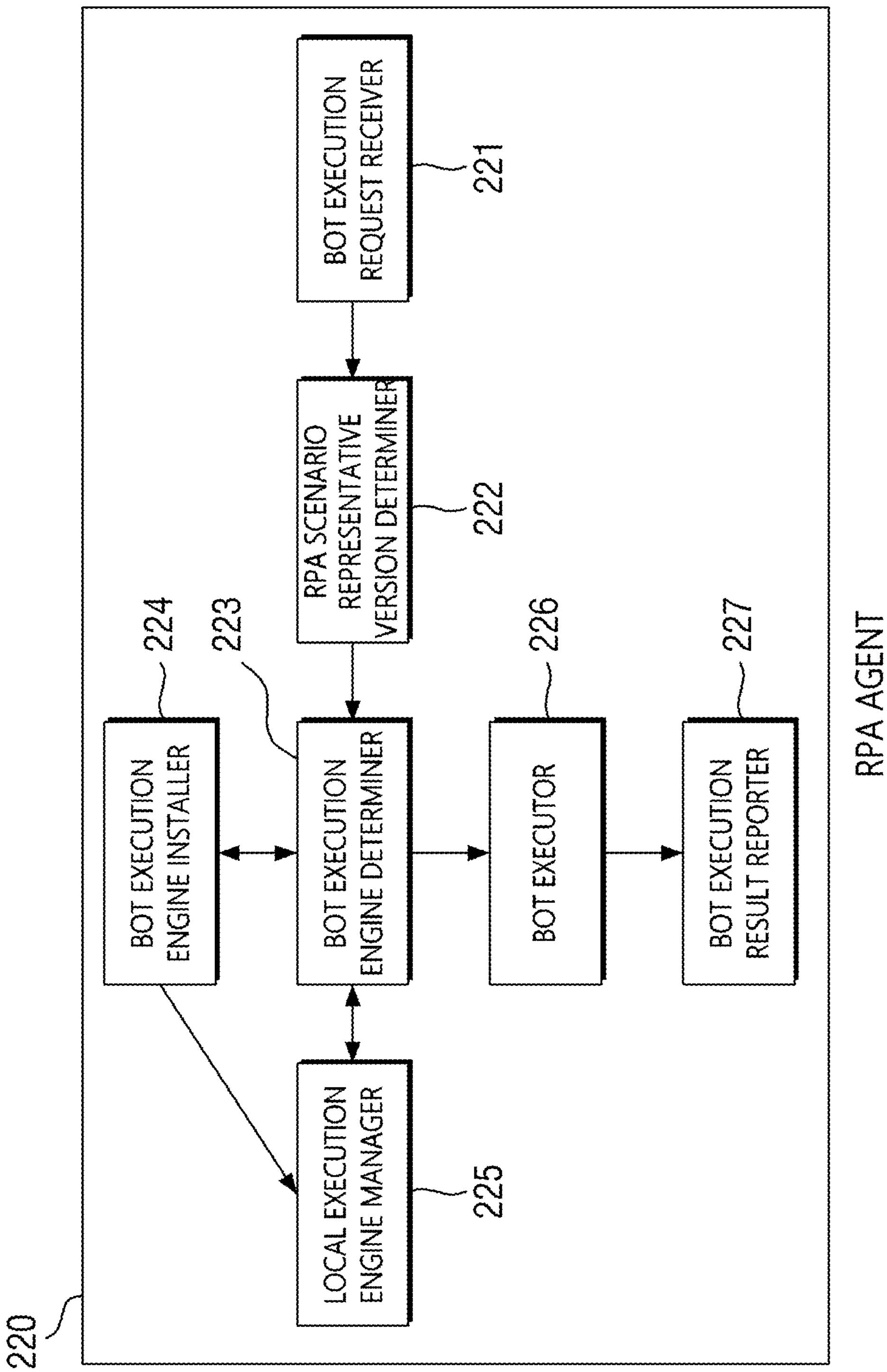
FIG. 3 is a logic block diagram of an RPA agent installed in the RPA bot execution device of FIG. 2.

Referring to FIG. 3, when a user input indicating an execution command for any of the RPA scenarios stored in the RPA scenario repository 230 is received, a bot execution request receiver 221 may control an RPA scenario representative version determiner 222 to decide the representative version of a target RPA scenario.

A bot execution engine determiner 223 may receive the RPA scenario representative version determined by the RPA scenario representative version determiner 222. Through a local execution engine manager 225, the bot execution engine determiner 223 may gather information regarding pre-installed RPA engines on the computing system where the RPA agent 220 is running. If there exists an RPA engine of the same version as the RPA scenario representative version among the pre-installed RPA engines, the bot execution engine determiner 223 may select the corresponding RPA engine as an optimal RPA engine version for executing the RPA scenario representative version.

If there is no RPA engine of the same version as the RPA scenario representative version, a bot execution engine installer 224 may download and install the optimal RPA engine version from the RPA agent service server 110.

A bot executor 226 may control the optimal RPA engine version to execute the target RPA scenario. Upon completion of the execution of the target RPA scenario, a bot execution result reporter 227 may generate RPA bot execution result report data, containing one or more metrics associated with the execution of the target RPA scenario, and may transmit the RPA bot execution result report data to the RPA agent service server 110.

In summary, the configuration and operation of the RPA system and the RPA bot execution device according to embodiments of the disclosure have been described. It is important to note that the understanding of the configuration or operation of the aforementioned RPA system and RPA bot execution device may encompass various technical aspects described in subsequent examples or embodiments.

An RPA bot execution optimization method according to an embodiment of the disclosure will hereinafter be described with reference to FIGS. 4 through 14.

The RPA bot execution optimization method according to an embodiment of the disclosure can be executed by one or more computing devices. This means that all operations involved in the RPA bot execution optimization method according to an embodiment of the disclosure may be carried out by a single computing device, or some of the operations may be performed by other computing devices. Moreover, considering a server system implemented on cloud computing nodes, operations conducted by one server system can also be divided and executed across multiple cloud computing nodes. Furthermore, the technical concepts evident from the descriptions of the RPA system and the RPA bot execution device according to embodiments of the disclosure are also applicable to the RPA bot execution optimization method according to an embodiment of the disclosure, even if not explicitly mentioned.

Figure 4:
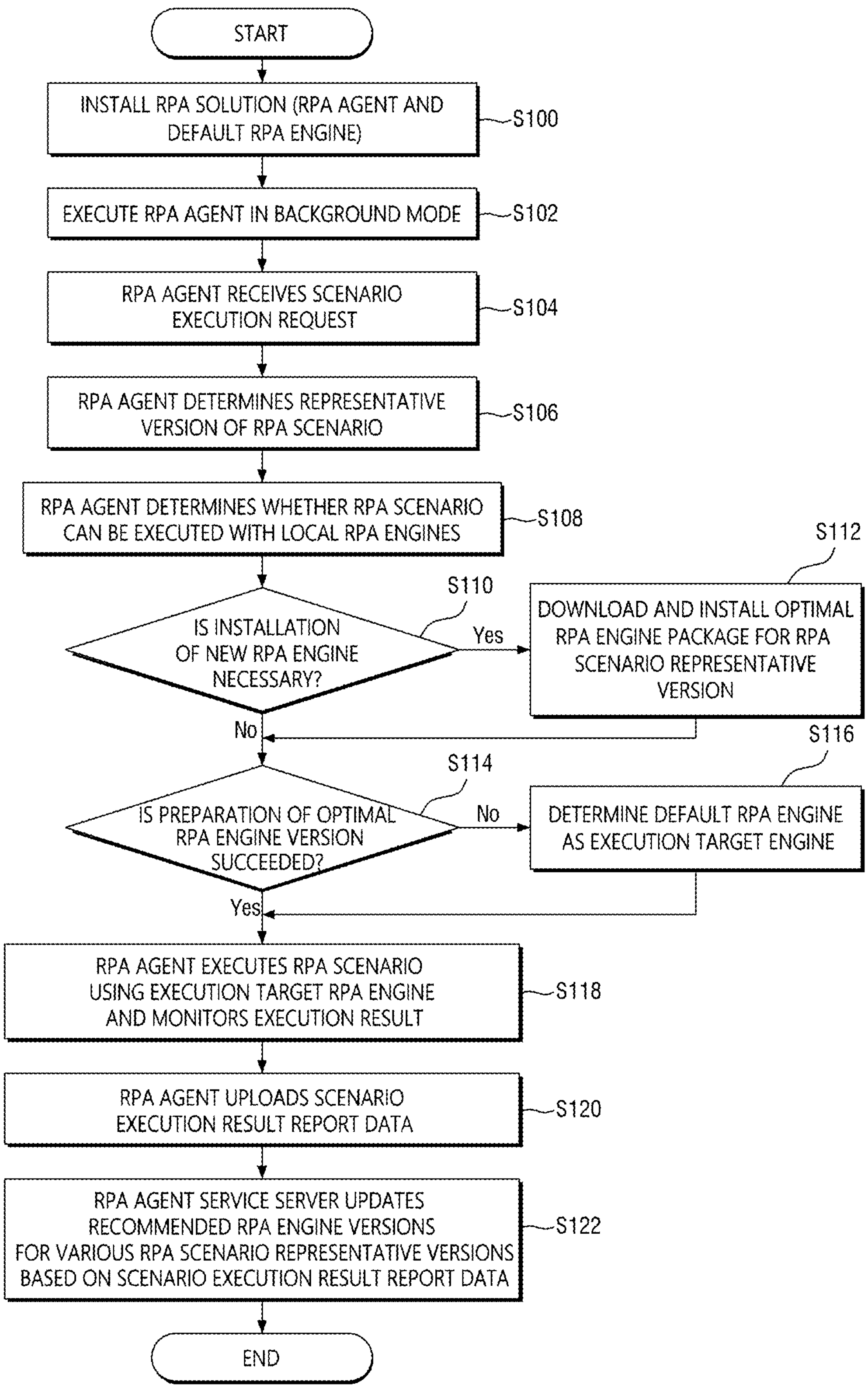
FIG. 4 is a flowchart illustrating an RPA bot execution optimization method according to an embodiment of the disclosure.

Referring to FIG. 4, in S100, an RPA solution is installed on an RPA bot execution device. The RPA solution may be an installable computer program that includes an RPA agent and a default RPA engine. Once installed, the RPA agent may be continuously executed in a background mode (S102).

In S104, upon receiving a user command to execute a particular RPA scenario, the RPA agent receives an execution request for the RPA scenario. Thereafter, the RPA agent determines a representative version of the RPA scenario (S106).

Figure 5:
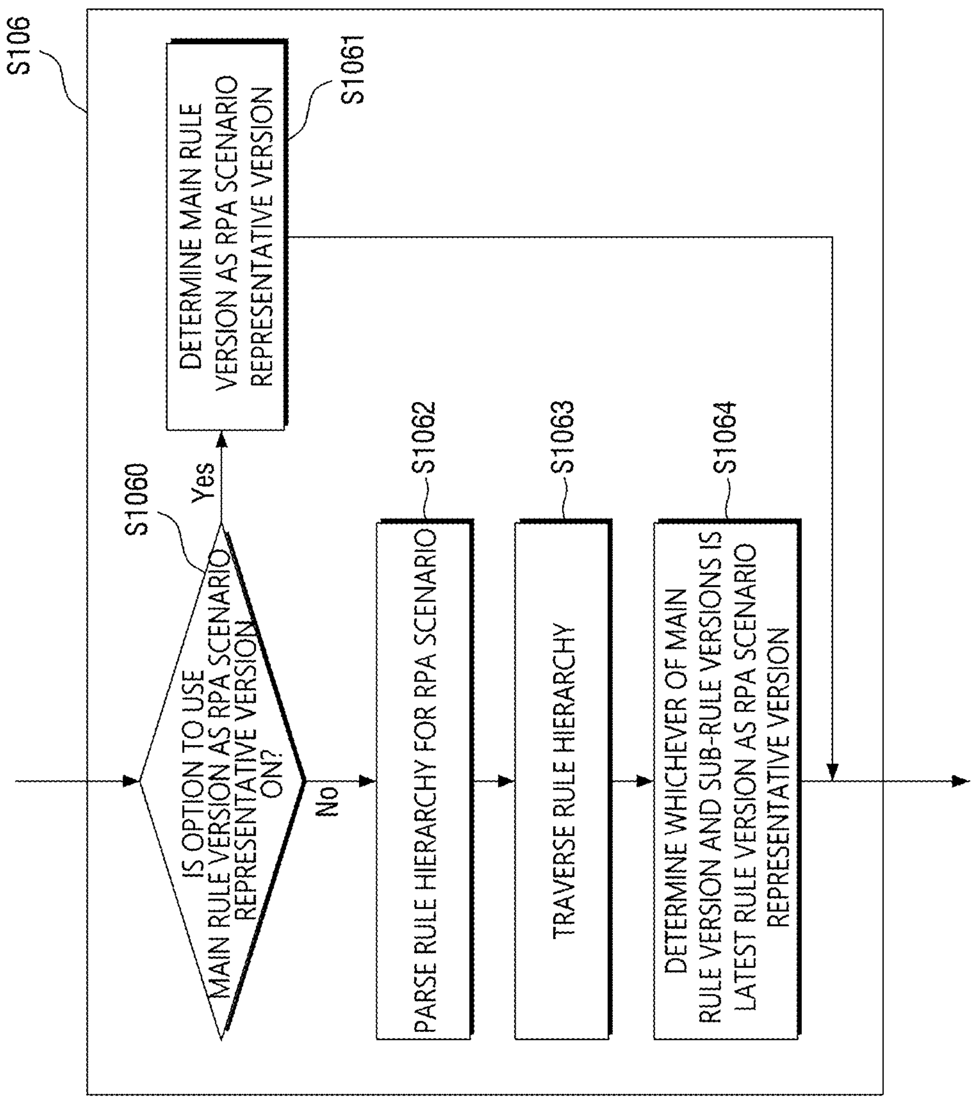
FIG. 5 is a detailed flowchart illustrating some of the operations depicted in FIG. 4.

S106 will hereinafter be described in further detail with reference to FIG. 5. Referring to FIG. 5, it is determined first whether an option to unconditionally use the version of a main rule of the RPA scenario as the RPA scenario representative version is activated (S1060). In S1061, if the option is activated, the version of the main rule may be chosen as the RPA scenario representative version.

Figure 6:
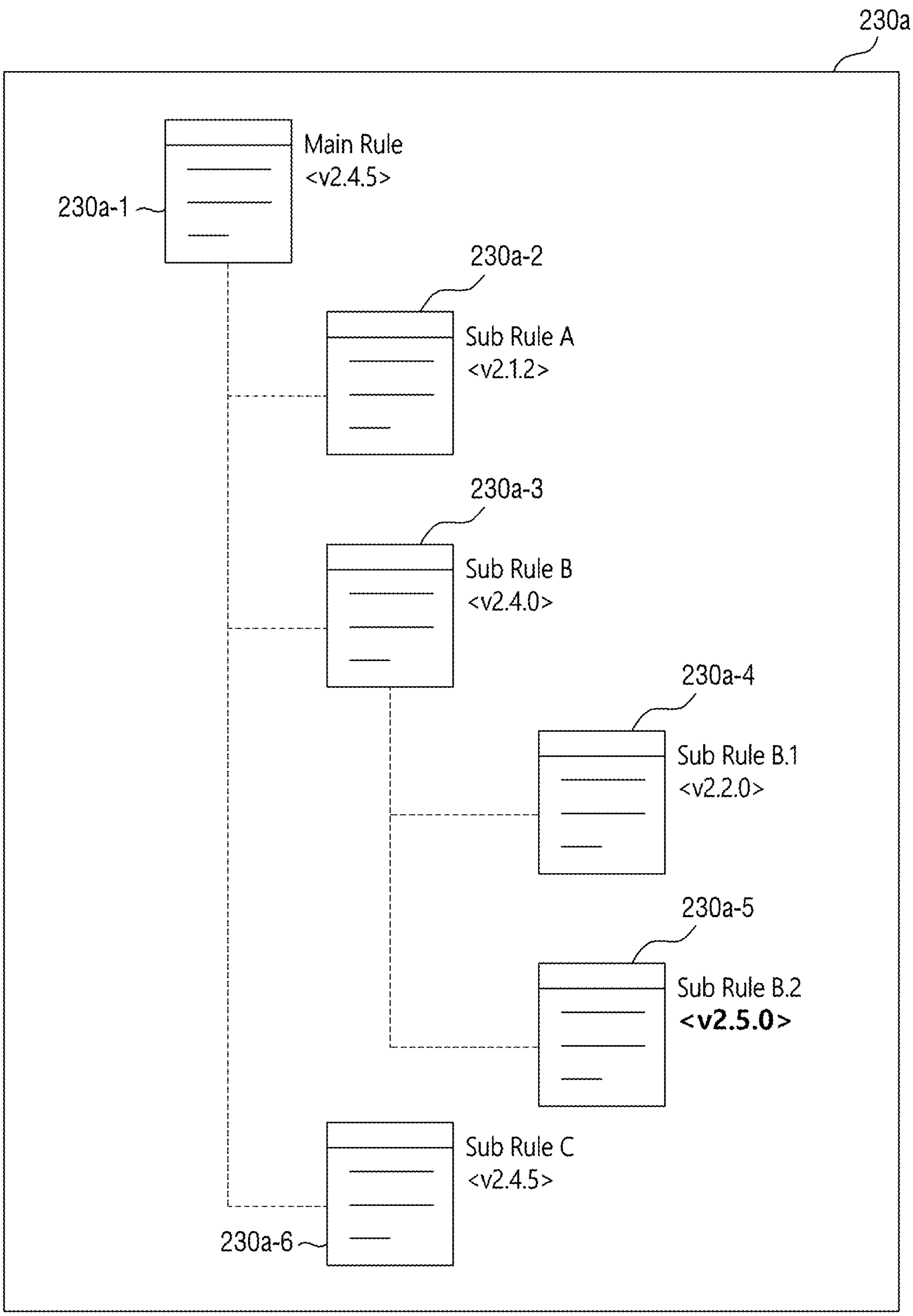
FIG. 6 illustrates an example rule hierarchy for an RPA scenario, which can be referenced in some embodiments of the disclosure.

On the contrary, if the option is not activated, the script file of the RPA scenario is loaded, and the rule hierarchy for the RPA scenario is parsed based on the loaded script file (S1062). As a result, as illustrated in FIG. 6, the rule hierarchy for the RPA scenario and version information for each rule of the RPA scenario can be identified.

The parsing of the rule hierarchy for the RPA scenario, i.e., S1062, involves constructing a hierarchical structure among the rules of the RPA scenario by extracting individual rule-specific meta-information tags 230*a*-1 through 230*a*-6, shown in FIG. 7, from the script file of the RPA scenario and connecting parent-child relationships for each rule of the RPA scenario based on the extracted rule-specific meta-information tags 230*a*-1 through 230*a*-6. In the example of FIG. 7, the parent-child relationships can be connected using a <SubRules> tag, and version information for each rule of the RPA bot can be identified using a "ruleVersion" parameter of a <Rule> tag.

As mentioned above, the "ruleVersion" parameter may have been automatically written by an RPA scenario authoring tool. The RPA bot authoring tool may identify an RPA engine version installed on its computing system and enter the identified RPA engine version to the "ruleVersion" parameter.

In some embodiments, after S1062, the RPA agent may decide the RPA scenario representative version by selecting whichever of the versions of the main rule and sub-rules of the RPA scenario is a latest rule version (S1064). Assuming that backward compatibility is maintained during RPA engine version upgrades, the latest rule version is chosen as the RPA scenario representative version, and an RPA engine version is chosen based on the chosen RPA scenario representative version, thus minimizing potential issues in executing the entire set of rules in the RPA scenario.

In the example of FIG. 6, the representative version of an RPA scenario 230*a* may be the version of sub-rule B.2 (230*a*-5), i.e., v2.5.0, which indicates the version of the RPA engine installed on the computing system when authoring sub-rule B.2 (230*a*-5), and activated later as an RPA bot authoring engine.

Alternatively, in some embodiments, the RPA agent may determine a main- or sub-rule version that has been used by a greatest number of rules of the RPA bot. For example, if the rule hierarchy for the RPA scenario 230*a* represents only a subset of the rules of the RPA bot and if sub-rule B (230*a*-3) with version v2.4.0 is used by the majority of rules of the RPA bot, the version of sub-rule B (230*a*-3), i.e., v2.4.0, rather than the latest version v2.5.0, may be chosen as the representative version of the RPA scenario 230*a*. In this case, the stability of executing of multiple rules can be prioritized.

If backward compatibility is not maintained during RPA engine version upgrades, potential issues in executing the entire set of rules of the RPA bot can be minimized by choosing a main- or sub-rule version that has been used by a greatest number of rules of the RPA bot as the RPA scenario representative version.

Alternatively, in some embodiments, a flag indicating whether the RPA engine's package information satisfies backward compatibility may be recorded. Then, if the flag indicates that the RPA engine corresponding to the RPA scenario representative version determined based on the latest main- or sub-rule version is problematic in terms of backward compatibility, the main- or sub-rule version that has been used by a greatest number of rues of the RPA bot may be chosen as the RPA scenario representative version.

Figure 8:
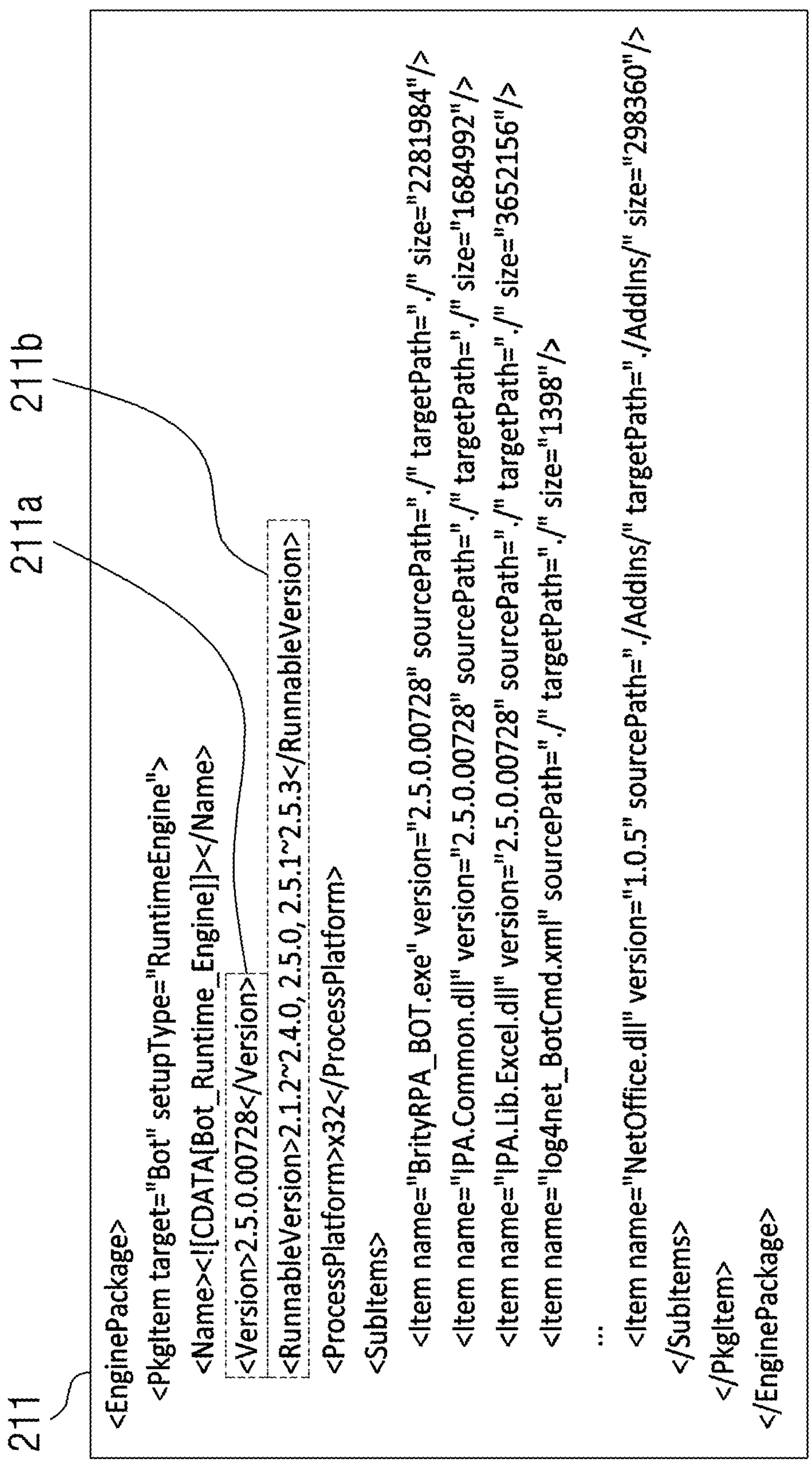
FIG. 8 is a schematic view for explaining the package structure of an RPA engine, which can be referenced in some embodiments of the disclosure.

Referring to FIG. 8, profile information 211 for the RPA engine's package may be added to the RPA engine. The profile information 211 may include a version tag 211*a* and an executable version tag 211*b*. Profile information for each RPA engine version, stored in an RPA engine archive described above with reference to FIG. 1, may be analyzed, and the results of the analysis may be managed in the form of a table 120*a* as shown in FIG. 10. An RPA agent service server may refer to the table 120*a* of FIG. 10 to determine an optimal RPA engine version.

In some embodiments, although not explicitly shown in FIG. 8, additional information for each RPA engine, such as the aforementioned backward compatibility satisfaction flag, may be included in the profile information 211.

The determination of the RPA scenario representative version by the RPA agent as performed during the RPA bot execution optimization method according to an embodiment of the disclosure have been described, and the description will continue referring back to FIG. 4.

Referring again to FIG. 4, in S108, the RPA agent determines whether there exists an RPA engine capable of executing the RPA scenario representative version exists among RPA engines installed on the computing system where the RPA agent is installed. To search for the RPA engines installed on the computing system where the RPA agent is installed, the RPA agent may examine an installation folder 225*a* of FIG. 11.

Figure 11:
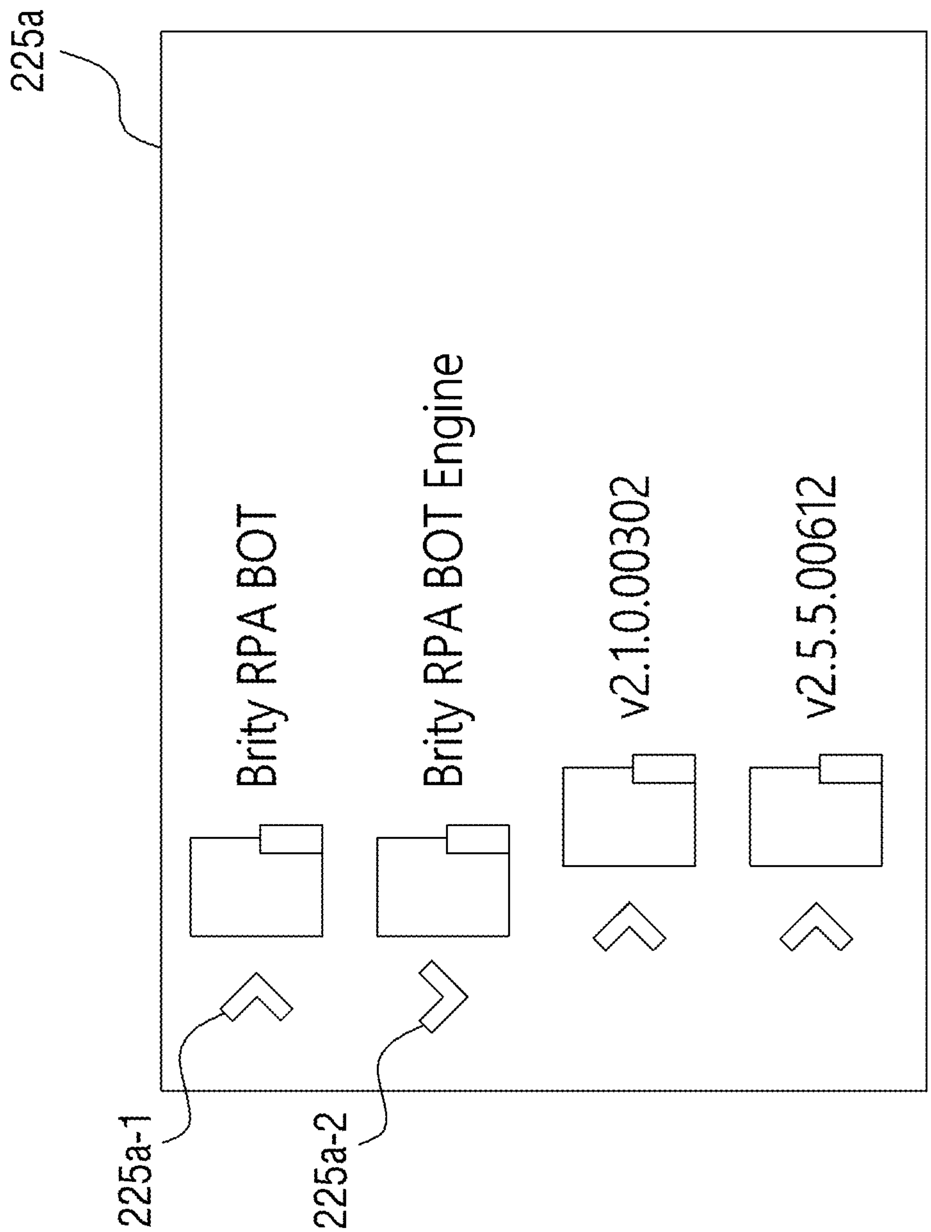
FIG. 11 illustrates an example folder structure of a computing system where an RPA solution is installed, according to some embodiments of the disclosure.

Referring to FIG. 11, the installation folder 225*a* may include a folder 225*a*-1 where the RPA agent and the default RPA engine are installed during the initial installation of the RPA solution and a folder 225*a*-2 where an additional RPA engine version is installed by the RPA agent. The version of the default RPA engine may be stored in a profile file, either in a registry or in the folder 225*a*-1. The name of the folder 225*a*-2, where the additional RPA engine version is installed, may reflect the additional RPA engine version. Consequently, the RPA agent can identify all RPA engine versions present on the computing system where the RPA agent is installed.

In order to execute the RPA scenario using an optimal RPA engine version than pre-installed RPA engines on the computing system where the RPA agent is installed, the RPA agent may determine (S108) whether there exists an RPA engine capable of executing the RPA scenario representative version among the pre-installed RPA engines on the computing system where the RPA agent is installed, only when an RPA engine having the same version as the RPA scenario representative version is found within the pre-installed RPA engines on the computing system where the RPA agent is installed.

In S112, if the result of S108 indicates that none of the pre-installed RPA engines are capable of executing the RPA scenario representative version, an optimal RPA engine package corresponding to the RPA scenario representative version may be downloaded and installed on the computing system where the RPA agent is installed. Specifically, in S112, upon the RPA agent sending an optimal RPA engine provisioning request containing information regarding the RPA scenario representative version to the RPA agent service server, the RPA agent service server may choose an optimal RPA engine version for the RPA scenario representative version and transmit the chosen optimal RPA engine version to the computing system where the RPA agent is installed.

It will hereinafter be described how the RPA agent service server selects the optimal RPA engine version for the RPA scenario representative version with reference to FIG. 9.

Figure 9:
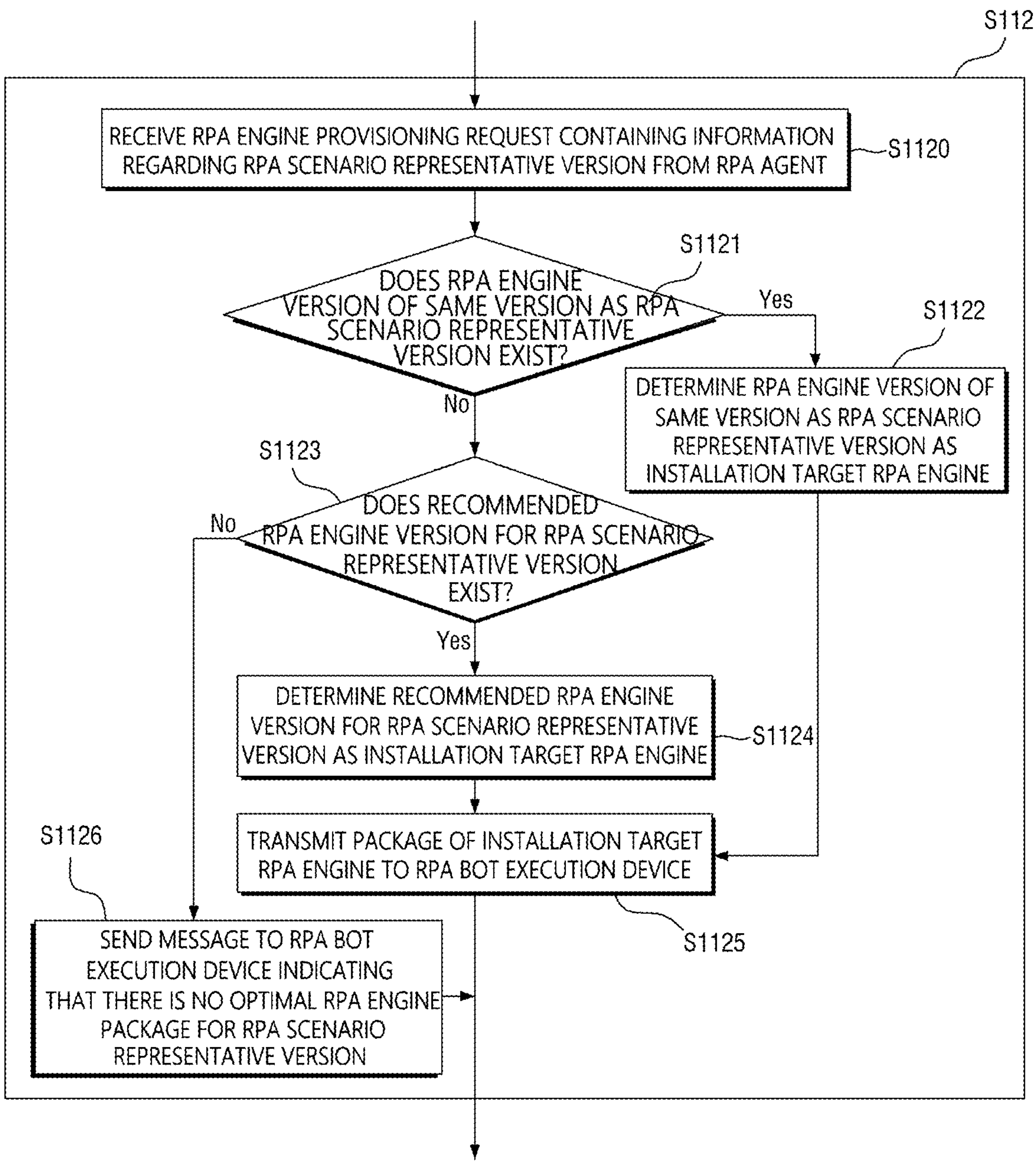
FIG. 9 is a detailed flowchart illustrating some of the operations of the RPA bot execution optimization method of FIG. 4.

Referring to FIG. 9, when the RPA agent service server receives the RPA engine provisioning request, containing the information regarding the RPA scenario representative version, from the RPA agent (S1120), the RPA agent service server may determine an optimal RPA engine package version in accordance with multiple priority-based criteria for optimal version selection and may transmit data of the optimal RPA engine package version to the computing device where the RPA agent is installed. The multiple priority-based criteria may include primarily prioritizing an RPA engine of the same version as the RPA scenario representative version, secondarily prioritizing an RPA engine with a recommended version for the RPA scenario representative version, and tertiarily prioritizing an RPA engine equipped with an engine profile included in RPA engine versions capable of executing the RPA scenario representative version.

As a result, the RPA agent service server determines (S1121) whether an RPA engine of the same version as the RPA scenario representative version exists in the RPA engine archive. If there exists an RPA engine of the same version as the RPA scenario representative version exists in the RPA engine archive (S1121), the RPA agent service server designates the corresponding RPA engine as an installation target RPA engine (S1122). However, if there is no RPA engine of the same version as the RPA scenario representative version in the RPA engine archive (S1121), the RPA agent service server determines (S1123) whether there exists a recommended RPA engine version for the RPA scenario representative version in a table of recommended RPA engine versions for various RPA scenario representative versions. If the recommended RPA engine version exists (S1123), it may be determined as the installation target RPA engine (S1124). The table of recommended RPA engine versions for various RPA scenario representative versions will be described later with reference to FIGS. 12 through 14.

The RPA agent service server may transmit the package file of the installation target RPA engine to the RPA bot execution device (S1125).

If neither an RPA engine of the same version as the RPA scenario representative version exists in the RPA engine archive (S1121) nor a recommended RPA engine version for the RPA scenario representative version is found in the table of recommended RPA engine versions for various RPA scenario representative versions (S1123), the RPA agent service server may send a message to the RPA bot execution device (S1126) indicating that the optimal RPA engine version for the RPA scenario representative version is not stored on the RPA agent service server. In this case, as an alternative, the RPA agent service server may execute the RPA scenario representative version using the default RPA engine.

Evidently, if the result of S108 indicates that an RPA engine capable of executing the RPA scenario representative version exists among the pre-installed RPA engines, the corresponding RPA engine may be chosen as the optimal RPA engine version for the RPA scenario representative version.

Through S110 and S112, the RPA agent may determine an execution target RPA engine. However, if no RPA engine capable of executing the RPA scenario representative version is found among the pre-installed RPA engines and if the RPA agent service server fails to select the optimal RPA engine version for the RPA scenario representative version (S114), the RPA agent may designate the default RPA engine installed together with the RPA agent during the initial installation of the RPA solution as the execution target RPA engine (S116).

The RPA agent may control the execution target RPA engine to execute the RPA (S118). The RPA agent not only executes the RPA scenario with the execution target RPA engine, but also monitors whether the execution of the RPA scenario is completed, and upon completion, generates RPA bot execution report data containing one or more metrics associated with the execution of the RPA scenario, and transmits the RPA bot execution report data to the RPA agent service server (S120).

Since the RPA bot execution report data serves to evaluate the compatibility between the version of the execution target RPA engine and the RPA scenario representative version, the RPA bot execution report data may include either the version of the execution target RPA engine and the RPA scenario representative version or the version of the execution target RPA engine and the identifier (ID) of the RPA scenario. If the RPA bot execution report data includes the version of the execution target RPA engine and the ID of the RPA scenario, the RPA agent service server may retrieve the RPA scenario representative version from an RPA scenario repository using the ID of the RPA scenario.

By using the RPA bot execution report data, the RPA agent service server may generate and update information regarding recommended RPA engine versions for various RPA scenario representative versions (S122). This will hereinafter be described in further detail with reference to FIGS. 12 through 14.

Referring to FIG. 12, the RPA bot execution report data may include one or more metrics associated with the execution of one or more RPA bots. For example, these metrics may include a first metric 1221 indicating the success rate of executing the RPA scenario representative version with each target RPA engine version, a second metric 1222 indicating the amount of time taken to execute each target RPA engine version in connection with the execution of the RPA scenario representative version, a third metric 1223 indicating the frequency of usage of each target RPA engine version in the execution of the RPA scenario representative version, and a fourth metric 1224 indicating the time elapsed since the recent usage of each targeted RPA engine version in executing the RPA scenario representative version.

The RPA agent service server may create and update a table of recommended RPA engine versions for various RPA scenario representative versions based on the RPA bot execution report data transmitted by the RPA agent. The recommended RPA engine versions for the various RPA scenario representative versions may be determined based on suitability scores calculated using the metrics included in the RPA bot execution report data.

The suitability scores may be calculated to be higher as the success rate indicated by the first metric 1221 increases, the execution time indicated by the second metric 1222 decreases, the frequency of usage indicated by the third metric 1223 increases, and the time elapsed indicated by the fourth metric 1224 increases.

In addition, as shown in FIG. 12, weights may be assigned to the first through fourth metrics 1221 through 1224. For example, a highest weight may be assigned to the first metric 1221, and a second-highest weight may be assigned to the second metric 1222. In this example, the suitability scores can predict a high success rate and a short execution time with a high degree of accuracy.

Referring to FIG. 13, the RPA agent service server may insert each metric data from the RPA bot execution report data into a table 1225 according to the order in which the RPA bot execution report data is received from the RPA agent.

Referring to FIG. 14, the RPA agent service server may create and update a table 1226 of information regarding recommended RPA engine versions for various RPA scenario representative versions. By periodically or intermittently repeating the calculation of suitability scores for different execution RPA engine versions for each RPA scenario, the RPA agent service server may consistently update the optimal RPA engine version for each RPA scenario. In the example of FIG. 14, an optimal RPA engine version for BOT_002 may be v2.5.0 (1226*a*).

In some embodiments, an RPA solution embodying the technical concepts of the disclosure may be provided. The RPA solution may be software recorded on a computer-readable recording medium. When executed by a computing system, the RPA solution may execute the steps of installing an RPA agent on the computing system, installing a default RPA engine on the computing system, and initiating the constant running of the RPA agent in a background mode.

The RPA agent may be a computer program for acquiring an execution request for an RPA bot, determine a representative version of an RPA scenario, preparing an optimal RPA engine version for executing the RPA scenario representative version, and controlling the prepared optimal RPA engine version to execute the RPA scenario.

Figure 15:
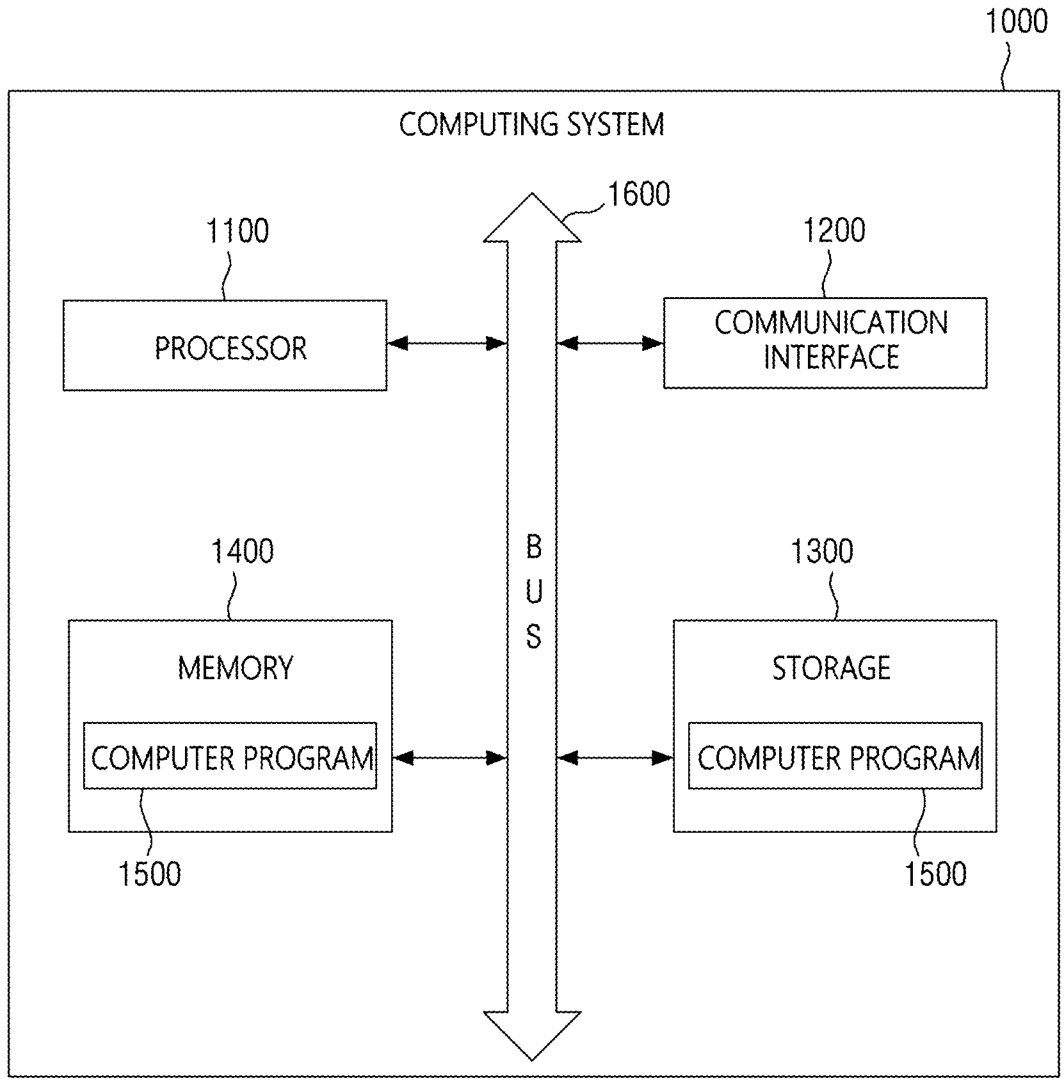
FIG. 15 illustrates a hardware configuration of a computing system according to some embodiments of the disclosure.

FIG. 15 illustrates a hardware configuration of a computing system according to some embodiments of the disclosure. Referring to FIG. 15, a computing system 1000 may include at least one processor 1100, a system bus 1600, a communication interface 1200, memory 1400, which loads a computer program 1500 executed by the processor 1100, and a storage 1300, which stores the computer program 1500. For example, the computing system 1000 may correspond to the RPA agent service server 110 or the RPA bot execution device 200*a* or 200*b* of FIGS. 1 and 2.

The processor 1100 controls the overall operation of the computing system 1000. The processor 1100 may perform computation for at least one application or program for executing methods/operations according to various embodiments of the disclosure. The memory 1400 stores various data, commands, and/or information. To execute the methods/operations according to various embodiments of the disclosure, the memory 1400 may load the computer program 1500 from the storage 1300. The storage 1300 may store the computer program 1500 non-temporarily. The computer program 1500 may include one or more instructions implementing the methods/operations according to various embodiments of the disclosure. Once the computer program 1500 is loaded into the memory 1400, the processor 1100 may execute the instructions to perform the methods/operations according to various embodiments of the disclosure.

The computer program 1500 may correspond to an RPA agent service program.

The computer program 1500 may include instructions for receiving an optimal RPA engine provisioning request signal requesting an optimal RPA engine version for a representative version of a target RPA scenario from an RPA agent if a first RPA engine of the same version as the RPA scenario representative version does not exist among a plurality of pre-installed different RPA engine versions on a computing system where the RPA agent is installed, instructions for determining an optimal RPA engine package based on multiple priority-based criteria for optimal version selection, and instructions for transmitting data of the determined optimal RPA engine package to the RPA agent.

The multiple priority-based criteria may include primarily prioritizing an RPA engine of the same version as the RPA scenario representative version, secondarily prioritizing an RPA engine of a recommended version for the RPA scenario representative version, and tertiarily prioritizing an RPA engine equipped with an engine profile included in RPA engine versions capable of executing the RPA scenario representative version.

In some embodiments, the computing system 1000 may be configured using one or more physical servers included in a server farm based on cloud technologies, such as virtual machines. In this case, at least some of the processor 1100, the memory 1400, and the storage 1300 may be implemented as virtual hardware, and the communication interface 1200 may also be implemented as a virtualized networking element such as a virtual switch.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the disclosure. Therefore, the disclosed preferred embodiments of the disclosure are used in a generic and descriptive sense only and not for purposes of limitation.

What is claimed is:

1. A robotic process automation (RPA) bot execution optimization method executed by a computing system, comprising:

performing an installation of an RPA solution on the computing system, the installation comprising installing an RPA agent and a default RPA engine;

acquiring, by the installed RPA agent, an execution request for an RPA bot;

determining, by the installed RPA agent, a representative version of an RPA scenario for the RPA bot;

identifying, by the installed RPA agent, an optimal RPA engine version for executing the RPA scenario representative version, from among a plurality of RPA engine versions compatible with the RPA scenario representative version, based on multiple priority-based criteria that differentially prioritize the plurality of RPA engine versions;

provisioning, by the installed RPA agent, the identified optimal RPA engine version for execution of the RPA scenario by the RPA bot, wherein the multiple priority-based criteria include primarily prioritizing an RPA engine of the same version as the RPA scenario representative version, secondarily prioritizing an RPA engine with a recommended version for the RPA scenario representative version, and tertiarily prioritizing an RPA engine equipped with an engine profile included in RPA engine versions capable of executing the RPA scenario representative version; and executing the RPA scenario by the RPA bot based on the identified optimal RPA engine version, wherein the installed RPA agent is executed in a background mode while the RPA robot is performing the execution of the RPA scenario.

2. The RPA bot execution optimization method of claim 1, wherein the RPA scenario is a script describing an automation target action to be executed by the RPA bot using the identified optimal RPA engine version, the automation target action includes a main rule and one or more sub-rules embedded in the main rule, the script includes meta information regarding the main rule and sub-rules, the meta information includes version information for the main rule and version information for the sub-rules, the version information for the main rule corresponds to an RPA engine version used during creation of the main rule, and the version information for the sub-rules corresponds to an RPA engine version used during creation of the sub-rules, and the determining the RPA scenario representative version, comprises determining one of a version corresponding to the version information for the main rule and a version corresponding to the version information for the sub-rules as the RPA scenario representative version.

3. The RPA bot execution optimization method of claim 2, wherein the determining one of the version corresponding to the version information for the main rule and the version corresponding to the version information for the sub-rules as the RPA scenario representative version, comprises loading a script of the RPA scenario, parsing the loaded script to identify rule hierarchical relationships between the main rule and the sub-rules of the RPA scenario, identifying versions of the main rule and sub-rules of the RPA scenario using the identified rule hierarchical relationships, and determining one of the identified versions of the main rule and sub-rules as the RPA scenario representative version.

4. The RPA bot execution optimization method of claim 2, wherein the determining one of the version corresponding to the version information for the main rule and the version corresponding to the version information for the sub-rules as the RPA scenario representative version, comprises determining whichever of the version corresponding to the version information for the main rule and the version corresponding to the version information for the sub-rules is a latest rule version as the RPA scenario representative version.

5. The RPA bot execution optimization method of claim 2, wherein the determining one of the version corresponding to the version information for the main rule and the version corresponding to the version information for the sub-rules as the RPA scenario representative version, comprises determining whether an option to use a version of the main rule as the RPA scenario representative version is activated, and if a determination is made that the option to use the version of the main rule as the RPA scenario representative version is activated, determining the version corresponding to the version information for the main rule as the RPA scenario representative version.

6. The RPA bot execution optimization method of claim 1, wherein the identifying the optimal RPA engine version comprises, if there exists a first RPA engine of a same version as the RPA scenario representative version among multiple different RPA engine versions installed on the computing system, and choosing the first RPA engine as the optimal RPA engine version, and the multiple different RPA engine versions include the default RPA engine and additional RPA engine versions additionally installed on a computing device by the installed RPA agent.

7. The RPA bot execution optimization method of claim 6, wherein the identifying the optimal RPA engine version, further comprises sending a request for an update package for the first RPA engine to an RPA agent service server and downloading the update package for the first RPA engine.

8. The RPA bot execution optimization method of claim 1, wherein the identifying the optimal RPA engine version, comprises sending an optimal RPA engine version provisioning request signal for the RPA scenario representative version to an RPA agent service server, if a first RPA engine of a same version as the RPA scenario representative version does not exist among multiple different RPA engine versions installed on the computing system, determining, by the RPA agent service server, an optimal RPA engine package for the optimal RPA engine version based on the multiple priority-based criteria, and transmitting, by the RPA agent service server, data of the determined optimal RPA engine package to a computing device.

9. The RPA bot execution optimization method of claim 1, wherein the recommended version for the RPA scenario representative version is acquired from a table of recommended RPA engine versions for various RPA scenario representative versions, created and updated based on RPA bot execution result report data transmitted by the RPA agent.

10. The RPA bot execution optimization method of claim 1, further comprising:

monitoring, by the installed RPA agent, whether the execution of the RPA scenario by the RPA bot is completed; and upon completion, generating, by the installed RPA agent, RPA bot execution report data containing one or more metrics associated with the execution of the RPA bot and transmitting, by the installed RPA agent, the RPA bot execution report data to an RPA agent service server.

11. The RPA bot execution optimization method of claim 10, further comprising:

creating and updating, by the RPA agent service server, a table of recommended RPA engine versions for various RPA scenario representative versions based on the RPA bot execution report data transmitted by the RPA agent, wherein the recommended RPA engine versions for the various RPA scenario representative versions are determined based on suitability scores calculated using the one or more metrics included in the RPA bot execution report data, and the suitability scores are calculated using a first metric indicating a success rate of executing the RPA scenario representative version with each target RPA engine version, a second metric indicating an amount of time taken to execute each target RPA engine version in connection with the execution of the RPA scenario representative version, a third metric indicating a frequency of usage of each target RPA engine version in the execution of the RPA scenario representative version, and a fourth metric indicating a time elapsed since a recent usage of each target RPA engine version in executing the RPA scenario representative version.

12. The RPA bot execution optimization method of claim 11, wherein the suitability scores are calculated by reflecting and combining weights for the first through fourth metrics, a highest weight is assigned to the first metric, and a second-highest weight is assigned to the second metric.

13. A robotic process automation (RPA) solution recorded on a non-transitory computer-readable recording medium, the RPA solution being executed by a computing system to execute:

installing an RPA agent on the computing system;

installing a default RPA engine on the computing system;

consistently executing the RPA agent in a background mode, wherein the RPA agent acquires an execution request for an RPA bot, determines a representative version of an RPA scenario for the RPA bot, identifies an optimal RPA engine version for executing the RPA scenario representative version, from among a plurality of RPA engine versions compatible with the RPA scenario representative version, based on multiple priority-based criteria that differentially prioritize the plurality of RPA engine versions, and provisions the identified optimal RPA engine version for execution of the RPA scenario by the RPA bot, wherein the multiple priority-based criteria include primarily prioritizing an RPA engine of the same version as the RPA scenario representative version, secondarily prioritizing an RPA engine with a recommended version for the RPA scenario representative version, and tertiarily prioritizing an RPA engine equipped with an engine profile included in RPA engine versions capable of executing the RPA scenario representative version; and executing the RPA scenario by the RPA bot based on the identified optimal RPA engine version.

14. The RPA solution of claim 13, wherein the RPA solution comprises a communication interface exchanging data with the computing system where the RPA agent is installed, a memory where an RPA agent service program is loaded, and a processor executing the RPA agent service program, the RPA agent service program includes instructions for receiving an optimal RPA engine provisioning request signal for the RPA scenario representative version from the RPA agent if a first RPA engine of a same version as the RPA scenario representative version does not exist among multiple different RPA engine versions installed on the computing system where the RPA agent is installed, instructions for determining an optimal RPA engine package based on multiple priority-based criteria that differentially prioritize the plurality of RPA engine versions, and instructions for transmitting data of the determined optimal RPA engine package to the RPA agent.

15. The RPA solution of claim 14, wherein the RPA agent service program further includes instructions for receiving RPA bot execution result report data containing one or more metrics associated with the execution of the RPA bot from the RPA agent upon completion of the execution of the RPA bot and instructions for creating and updating a table of recommended RPA engine versions for various RPA scenario representative versions based on the RPA bot execution result report data, the recommended RPA engine versions for the various RPA scenario representative versions are determined based on suitability scores calculated using the one or more metrics included in the RPA bot execution result report data, and the suitability scores are calculated using a first metric indicating a success rate of executing the RPA scenario representative version with each target RPA engine version, a second metric indicating an amount of time taken to execute each target RPA engine version in connection with the execution of the RPA scenario representative version, a third metric indicating a frequency of usage of each target RPA engine version in the execution of the RPA scenario representative version, and a fourth metric indicating a time elapsed since a recent usage of each target RPA engine version in executing the RPA scenario representative version.

* * * * *